(12) United States Patent
Waller et al.

(10) Patent No.: US 10,789,030 B2
(45) Date of Patent: Sep. 29, 2020

(54) DOCUMENT POOLING MECHANISM

(71) Applicants: Marquis G. Waller, Beverly, OH (US); Jeffrey Alan Sikkink, Longmont, CO (US); Walter R. Albers, Broomfield, CO (US); Michael Glen Lotz, Longmont, CO (US)

(72) Inventors: Marquis G. Waller, Beverly, OH (US); Jeffrey Alan Sikkink, Longmont, CO (US); Walter R. Albers, Broomfield, CO (US); Michael Glen Lotz, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/172,026

(22) Filed: Oct. 26, 2018

(65) Prior Publication Data
US 2020/0133602 A1 Apr. 30, 2020

(51) Int. Cl.
*G06F 3/12* (2006.01)

(52) U.S. Cl.
CPC .......... *G06F 3/1262* (2013.01); *G06F 3/1205* (2013.01); *G06F 3/1275* (2013.01)

(58) Field of Classification Search
USPC ................ 358/1.1–3.29, 1.11–1.18; 399/82, 399/403–411; 715/200–277
See application file for complete search history.

(56) References Cited

U.S. PATENT DOCUMENTS

| | | | |
|---|---|---|---|
| 6,732,194 B1 * | 5/2004 | Kopylovitz | G06F 3/0611 710/36 |
| 7,916,332 B2 | 3/2011 | Kato | |
| 8,300,238 B2 | 10/2012 | Kato | |
| 8,379,253 B2 | 2/2013 | Furuya | |
| 9,001,365 B2 | 4/2015 | Gaertner et al. | |
| 9,619,183 B2 | 4/2017 | Shiohara | |
| 9,772,806 B2 | 9/2017 | Rajalingam et al. | |
| 2011/0109930 A1 | 5/2011 | Eom et al. | |
| 2011/0122441 A1 * | 5/2011 | Shiohara | G06F 3/1205 358/1.15 |
| 2013/0074081 A1 * | 3/2013 | Cassetti | G06F 9/5011 718/102 |
| 2016/0246556 A1 * | 8/2016 | Rajalingam | G06F 3/1262 |
| 2018/0136889 A1 * | 5/2018 | Ward | G06F 3/1256 |
| 2019/0129660 A1 * | 5/2019 | Liebelt | G06F 3/1212 |

* cited by examiner

*Primary Examiner* — Marcellus J Augustin
(74) *Attorney, Agent, or Firm* — Jaffery Watson Mendonsa & Hamilton LLP

(57) ABSTRACT

A system to is described. The system includes at least one physical memory device to store print workflow manager and one or more processors coupled with the at least one physical memory devices to execute the print workflow manager receive a plurality of print jobs, each including a plurality of documents to be printed, receive job tickets including a description as to how pages in the plurality of documents are to be printed, store the plurality of documents in a document pool, store a document property record associated with each of the plurality of documents in the document pool, wherein a document property record provides and process the job tickets and the document property records to generate a combined print job including two or more of the plurality of the documents.

22 Claims, 9 Drawing Sheets

DOCUMENT POOLING MECHANISM

FIELD

This invention relates generally to the field of print services. More particularly, the invention relates to processing print jobs.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads). Production printers typically implement duplex printing to enable automatic printing on both sides of a sheet of paper.

Job Definition Format (JDF) is fast becoming the communication of choice for managing print production workflows between production printers, inserters, folders, cutters, and printing software. One advantage of JDF is the ability to define plex (e.g., duplex or simplex) settings for printing at the page level. This is important in cutsheet printers because the plex level JDF settings enables construction of Portable Document Format (PDF) files to that do not require blank backs to be inserted to ensure the output of a printed PDF is correct, resulting in more expensive printing since blank backs cost customers extra click charges.

Commercial printers have increasingly been implementing optimization solutions, such as document pools, to automate workflows in order to reduce printing expenses. Document pools allow a set of documents from various jobs to sit around in a "pool" waiting to be combined. These documents can be combined in any manner, (e.g., usually based on something like zip code for mailing, or a certain number for weight in an envelope). However a problem with pools is that documents in the pool may be a part of different jobs with different plex level page exceptions. Thus, when these various documents are brought together they need to also be compiled into a single PDF and JDF that takes into account the file (or job) level plexing as well as page level plexing exceptions that may have been identified for the various documents.

Accordingly, a pooling mechanism that manages both job level and page level plexing is desired.

SUMMARY

In one embodiment, a system is disclosed. The system includes at least one physical memory device to store print workflow manager and one or more processors coupled with the at least one physical memory devices to execute the print workflow manager to receive a plurality of print jobs, each including a plurality of documents to be printed, receive job tickets including a description as to how pages in the plurality of documents are to be printed, store the plurality of documents in a document pool, store a document property record associated with each of the plurality of documents in the document pool, wherein a document property record provides and process the job tickets and the document property records to generate a combined print job including two or more of the plurality of documents.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

A document pooling mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "interface", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
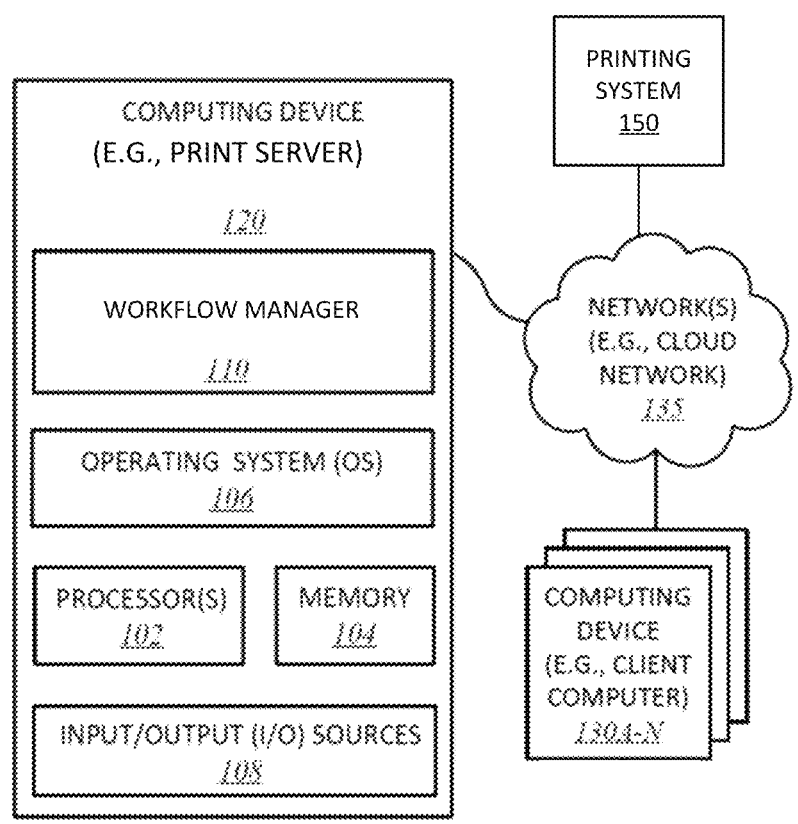
FIG. 1 illustrates one embodiment of a system having a computing device employing a workflow manager.

FIG. 1 illustrates a system 100 having a computing device 120 employing a workflow manager 110. In such an embodiment, computing device 120 includes a print server computer serving as a host machine for employing workflow manager 110 to manage print workflows received from one or more computing devices 130 for printing at printing system 110.

In one embodiment, computing device 120 includes an operating system ("OS") 106 serving as an interface between one or more hardware/physical resources of computing device 120, one or more client devices 130 (e.g., 130A-130N) and a printing system 150 via a network 135. Computing device 120 further includes processor(s) 102, memory 104, input/output ("I/O") sources 108, such as touchscreens, touch panels, touch pads, virtual or regular keyboards, virtual or regular mice, etc.

Figure 2:
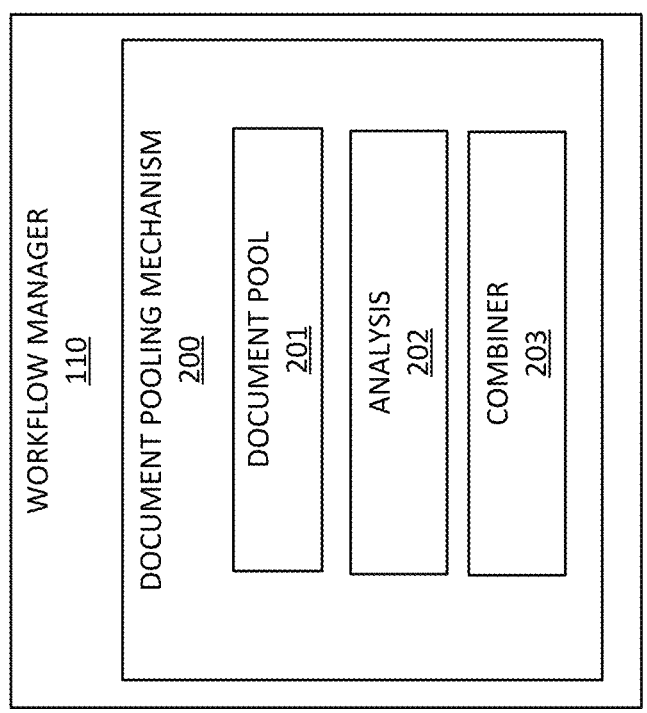
FIG. 2 illustrates one embodiment of a workflow manager.
Figure 3:
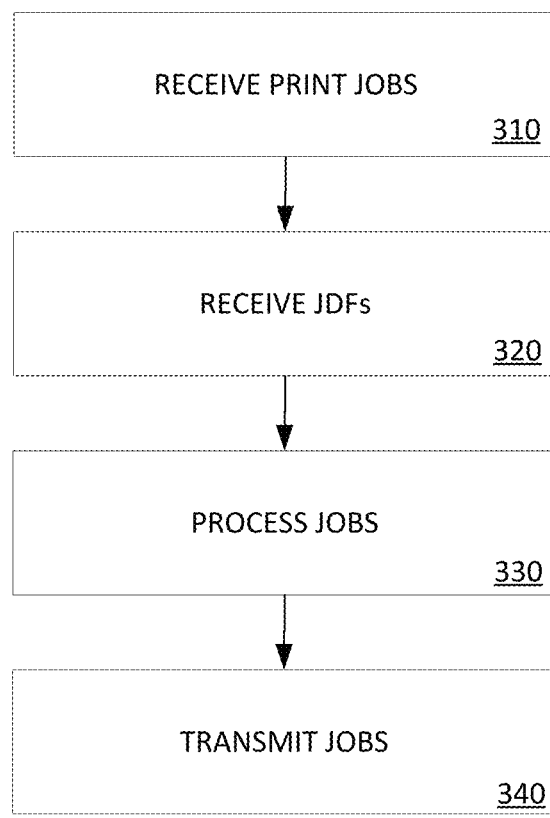
FIG. 3 is a flow diagram illustrating one embodiment of a method for performing a print workflow.

FIG. 2 illustrates one embodiment of workflow manager 110 to perform a print workflow. FIG. 3 is a flow diagram illustrating one embodiment of a process for performing a print workflow. At processing block 310, a print file including one or more print jobs (e.g., in a PDF format) is received. At processing block 320, job tickets are received to describe how the print jobs are to be printed. In one embodiment, the job ticket is a JDF ticket. At processing block 330, the print jobs are processed. In one embodiment, the processing includes the pooling various documents included in the jobs for combining, as will be discussed in detail below. At processing block 340, the jobs are transmitted for printing at printing system 150.

Figure 4:
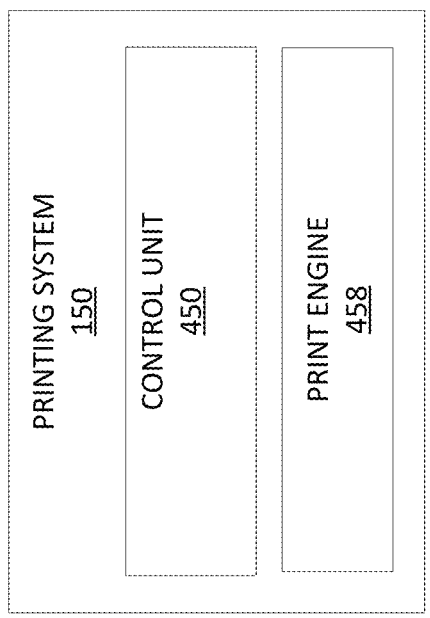
FIG. 4 illustrates one embodiment of a printing system.

FIG. 4 illustrates one embodiment of such a printing system 150. Printing system 150 includes a control unit 450 and a print engine 458. According to one embodiment, control unit 450 processes and renders objects received in print job data and provides sheet maps for printing to print engine 458. Control unit (e.g., DFE or digital front end) 450 is implemented to process image objects received at control unit 450 by a raster image processor (RIP) to convert an image described in a vector graphics format (e.g., shapes) into a raster image (e.g., pixels) that is to be stored as scan line data in a memory array (not shown) for output to print engine 458.

Referring back to FIG. 2, workflow manager 110 includes a pooling mechanism 200 that is implemented in the workflow to store documents for combination into a print job. As discussed above, there is currently a problem with combining documents in pools having plex level page exceptions that are different from a print job file (or print file) plexing. For instance, a print file having a setting specifying that all included documents are to be printed with an original duplex may include one or more documents having settings specifying a plex exception in which one or more pages are to be printed with simplex (e.g., one-sided).

In such instances, conventional pooling solutions must normalize the simplex job to duplex by inserting blank pages to be the backs of the simplex pages and changing the job to duplex. Subsequently, the original simplex documents may be inserted into the same duplex job. However, such a process significantly increases click charges and file sizes. To avoid this, combining pooled files are usually limited to one plex setting or the other (e.g., combining simplex documents together and separately combining duplex documents together).

According to one embodiment, pooling mechanism 200 implements a pooling that enables the combining of documents regardless of plex settings, resulting in a larger set of documents being processed. In such an embodiment, pooling mechanism 200 analyzes document files, job tickets and document properties to generate combined print jobs from a document pool. Thus, documents may be inserted into the pool with its original plexing (e.g., job or page exception).

In one embodiment, pooling mechanism 200 tracks document properties to maintain an association between an original job and individual documents being processed. Document properties represent document pages included in an associated PDF document file, which are to be considered upon combining a document. For instance, document properties may include various properties of the document (e.g., address, zip code, etc.).

In a further embodiment, pooling mechanism 200 analyzes an associated JDF file, in addition to the PDF, for each pooled document to ensure that an appropriate plexing is accounted for prior to combining a document with other documents and their respective plexing. In such an embodiment, the JDF file includes both job and page level exceptions for plexing that are to be considered when generating a combined print job file. Accordingly, pooling mechanism 200 ensures that documents pulled from the pool for combining to a job file takes into consideration the plex for each document prior to optimization for the combining.

According to one embodiment, pooling mechanism 110 includes document pool 201, analysis logic 202, combiner module 203. Document pool 201 maintains a pool of documents (e.g., PDF) that to be combined. In a further embodiment, document pool 201 includes the JDF plex settings for each individual document, as well as the document properties, for each document which were included in a job ticket received for the original associated print job.

Figure 5:
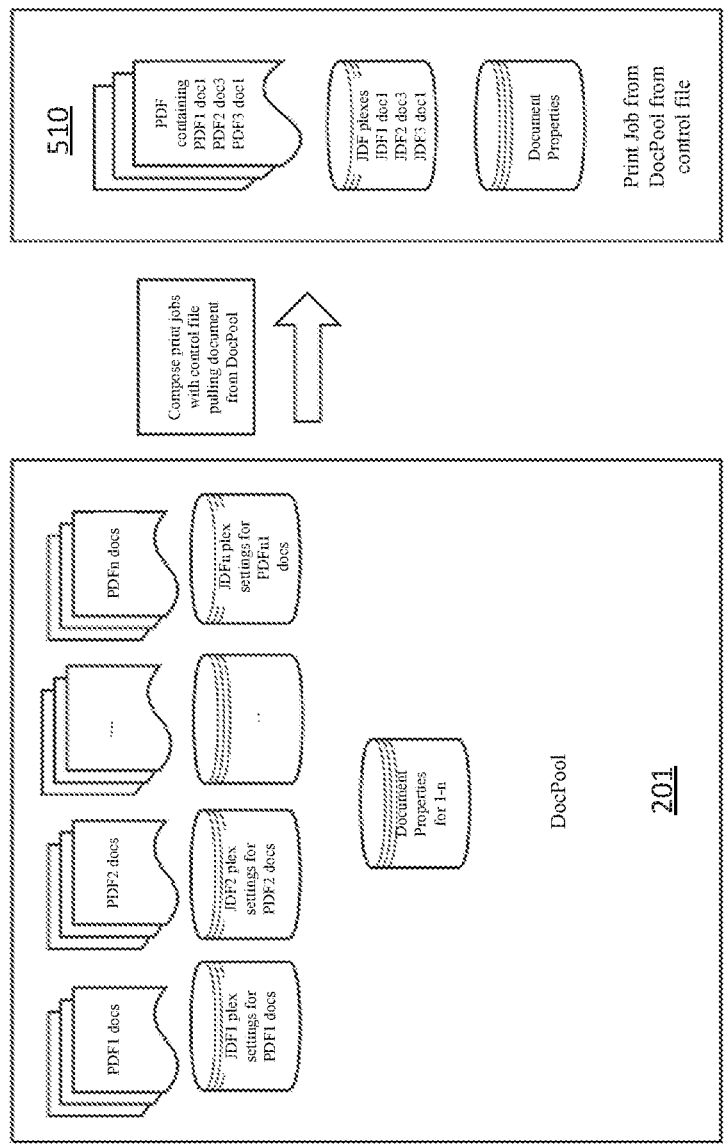
FIG. 5 illustrates one embodiment of a document pool.

FIG. 5 illustrates one embodiment of a document pool 201 from which a print job 510 is generated. As shown in FIG. 5, document pool 201 includes PDF docs 1-n. In one embodiment, one or more of the docs 1-n may originate from different print job files. Additionally, document pool 201 includes corresponding JDF plex settings for DF docs 1-n. Further, document pool 201 includes corresponding document properties for PDF docs 1-n.

Referring back to FIG. 2, analysis logic 202 retrieves document property records from pooled documents to process the associated document properties. In one embodiment, analysis logic 202 processes a document property record by extracting document PDF pages from pool 201, in addition to the JDF plex exceptions for the associated PDF document. In such an embodiment, analysis logic 202 analyzes the document properties to determine which documents should be combined. For example, analysis logic 202 may determine that various documents have similar document properties (e.g., zip code, state, account time, etc.), and therefore should be combined.

Further, analysis logic 202 adjusts plex exceptions for the document. In this embodiment, analysis logic 202 analyzes the plex settings from the original job ticket associated with the document, converts the document into a sheet model (e.g., fronts and backs) and adjusts to the plexing to that of the current job. In yet a further embodiment, analysis logic 202 also considers the document properties when adjusting the plex settings.

Combiner module 203 combines documents in document pool 201 to generate a combined print job. In one embodiment, combiner combines documents having one or more similar document properties. For example, documents that are to be mailed to the same state and/or zip code may be combined. In a further embodiment, combiner module 203 appends plex exceptions to the associated adjusted documents to generate a combined JDF job ticket. Referring back to FIG. 5, print job 510 includes combined PDF documents 1-3, and the corresponding combined job ticket including JDF plex settings and document properties for PDF docs 1-3 that are to be transmitted to printing system 150.

FIG. 6 is a flow diagram illustrating one embodiment of a process 600 for combining documents in a document pool. Process 600 may be performed by processing logic that may comprise hardware (e.g., circuitry, dedicated logic, programmable logic, etc.), software (such as instructions run on a processing device), or a combination thereof. In one embodiment, process 600 may be performed by pooling mechanism 110. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 605 (FIG. 6A), where a determination is made as to whether there are documents remaining in pool 201 that are to be examined. If not, a print job JDF is saved, processing block 610. At processing block 615, a print job PDF is saved. If at decision block 605, a determination is made that there are documents to examine, a document properties file is opened for the document, processing block 620. In one embodiment, each file includes a reference to the source PDF document and the original JDF with plex exceptions information for the document.

At decision block 625 (FIG. 6B), a determination is made as to whether a document property record is available. If no document property record is available, control is returned to decision block 605 where a determination is made as to whether there are more documents in pool 201 to be examined. If available, the document property record is retrieved, processing block 630. In one embodiment, a document property record includes a source of the PDF file name, the starting PDF page number, number of PDF pages and source JDF file name.

At processing block 635, the document property record is processed by extracting document PDF pages from document pool 210. At processing block 640, the JDF plex exceptions are extracted from the document. In one embodiment, the job plex and page plex settings are pulled for only the pages in the current document. At processing block 645, the plex exceptions for the current document are adjusted.

As discussed above, the adjustment includes analyzing the plex settings from the original JDF associated with the document (e.g., the plex for the original job and all plex exceptions for the current document). In a further embodiment, the current document is converted into a sheet model and adjusted to the plexing of the current job. In yet a further embodiment, any missing plex information is set as the plex setting assigned for the job.

Figure 7:
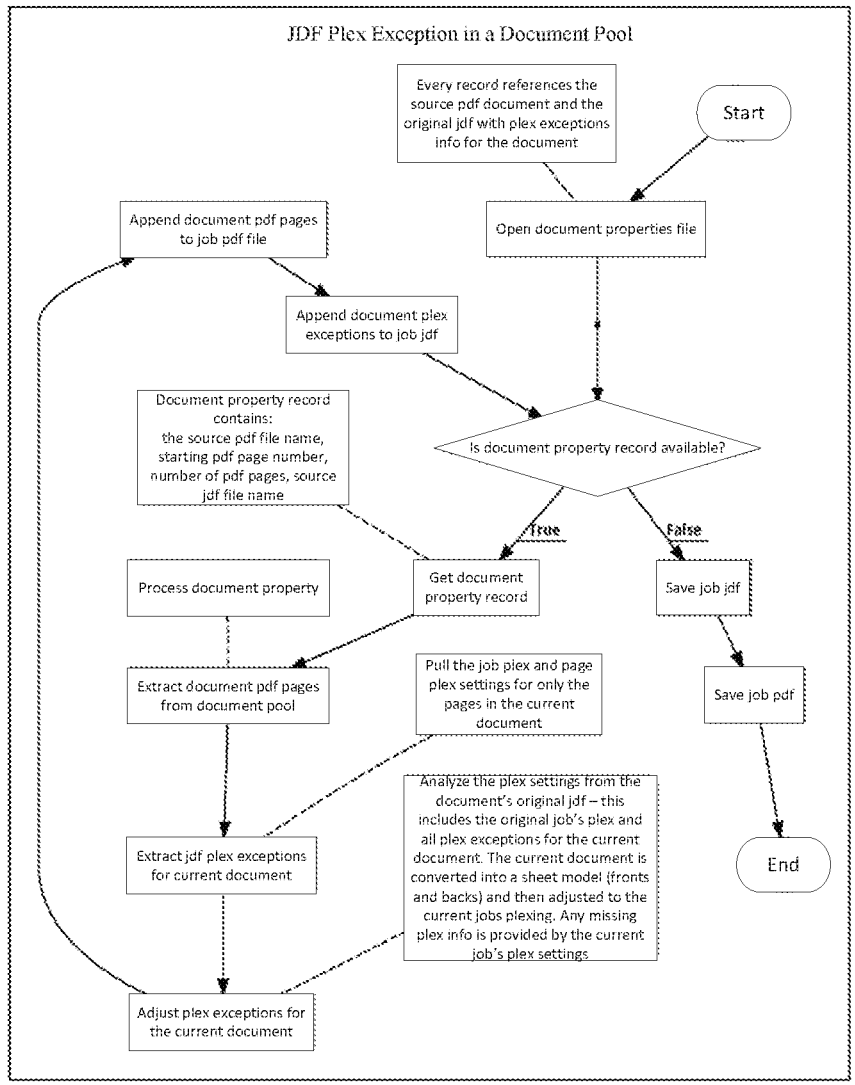
FIG. 7 illustrates another embodiment of a flow of a process for combining documents in a document pool.

At processing block 650, the document PDF pages are appended to the job PDF file. At processing block 655, the document plex exceptions are appended to the plex exceptions in the job JDF. Subsequently, control is returned to decision block 605 where a determination is made as to whether there are more documents in pool 201 to be examined. FIG. 7 illustrates another embodiment of a flow for combining documents in a document pool.

Figure 6A:
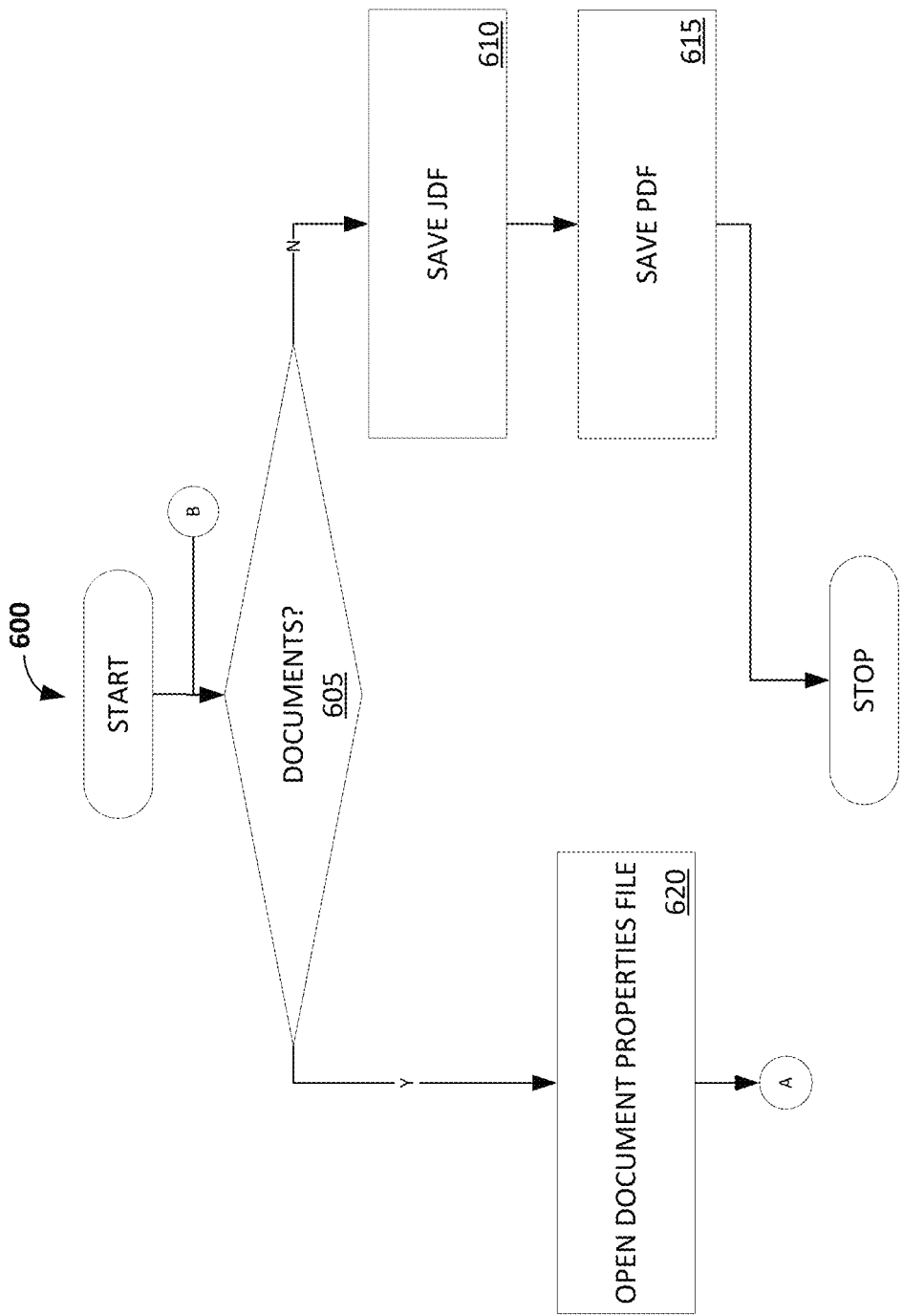
FIGS. 6A&6B is a flow diagram illustrating one embodiment of a process for combining documents in a document pool.
Figure 6B:
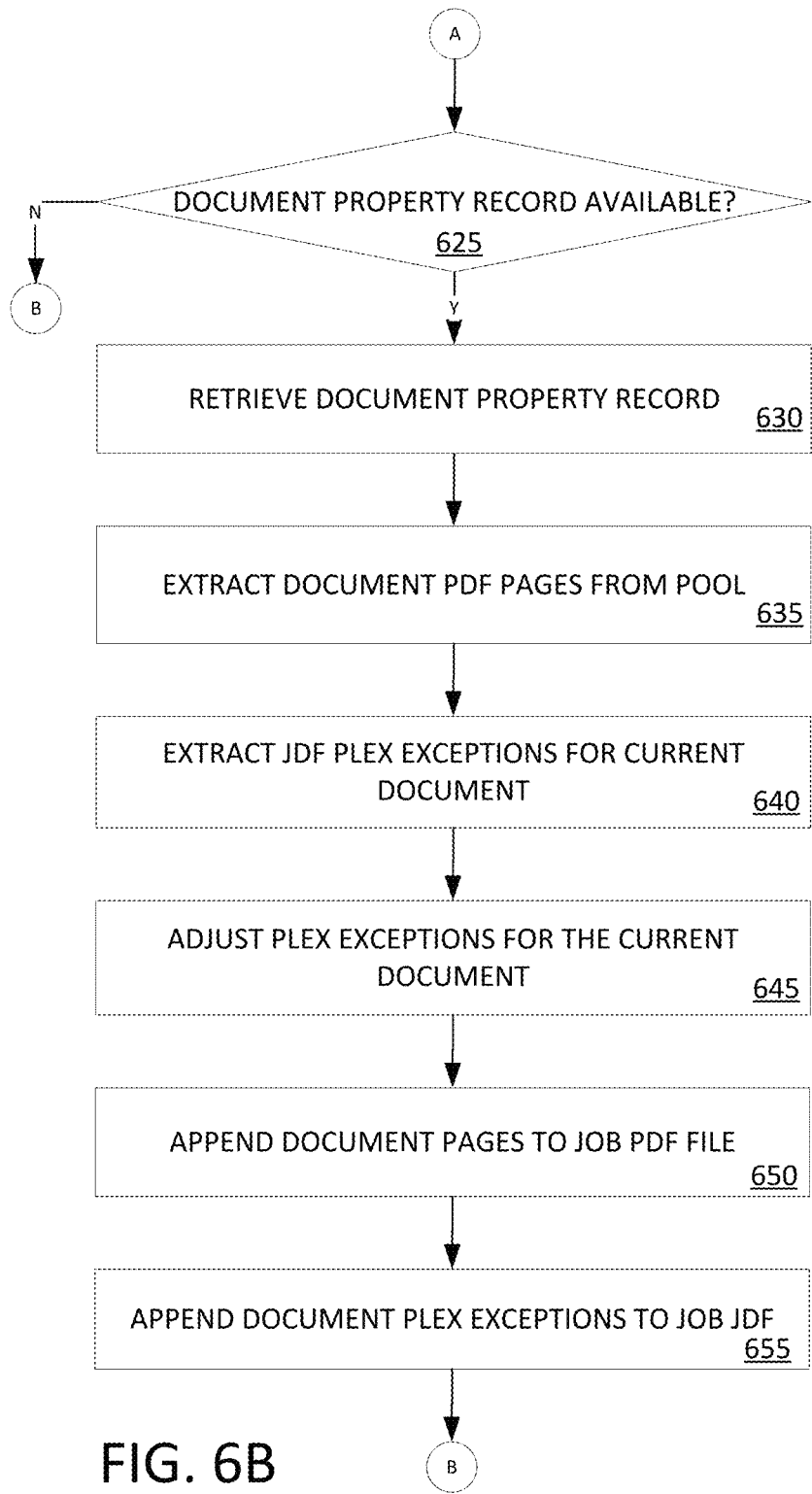

It can be seen from FIGS. 6A, 6B & 7 that this process allows the processor to receive a first group of documents to be printed and to create a subset of the first group of documents (a second group) that has a common predetermined characteristic. This common predetermined characteristic can be, for example, a zip code or other geographic mailing location, or an estimated weight such that a cumulative weight of one or more of the documents from the second group add up to a desired mailing weight. The process then evaluates a predetermined print aspect for the documents in the second group, such as plex, hole making (punch), number of copies, n-up setting, output bin setting, page rotation setting, and page cells setting, and creates a new job ticket for the second group of documents that such that it maintains the print aspect for the second group as originally defined from by the first job ticket. The second group of documents and the second job ticket can then be sent to the printer for printing and the resulting output will be conveniently grouped for the print shop.

Figure 8:
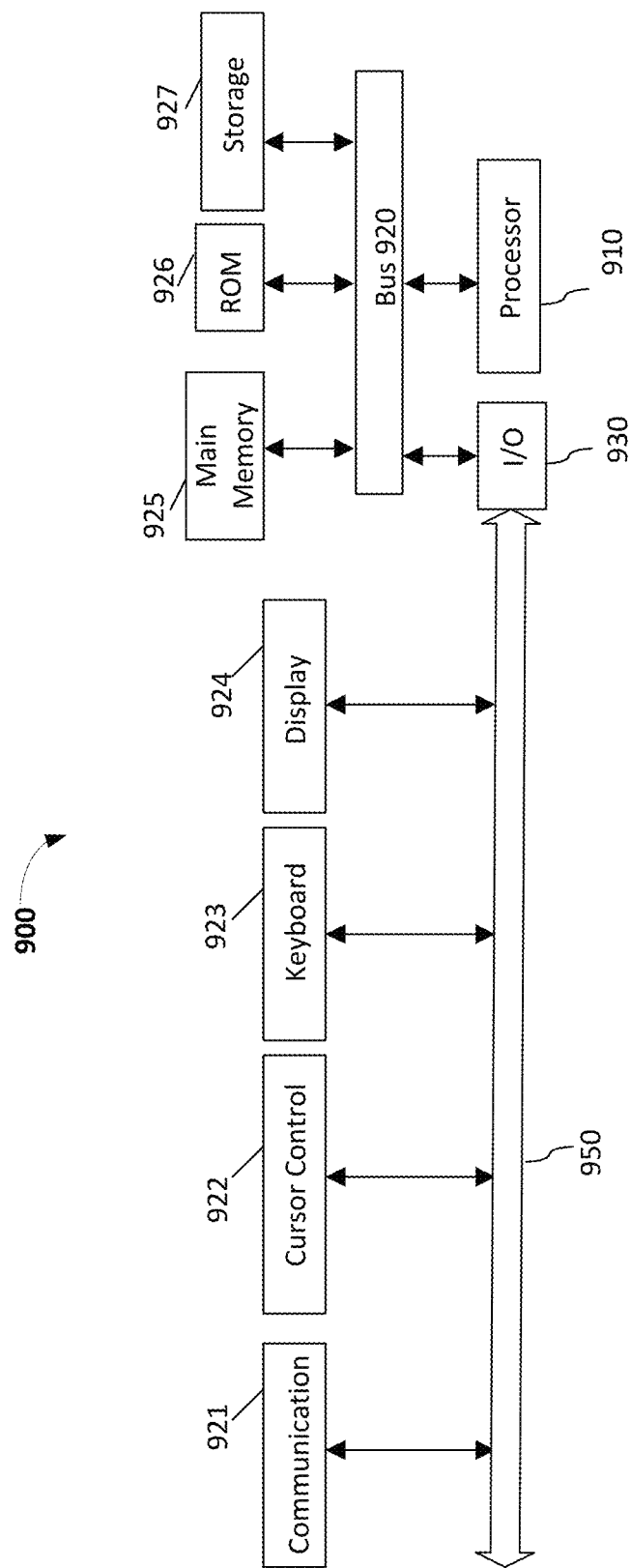
FIG. 8 illustrates a computing device suitable for implementing embodiments of the present disclosure.

FIG. 8 illustrates a computer system 900 on which computing device 120 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory computer-readable medium having stored thereon instructions that, when executed by one or more processors, cause the one or more processors to:
   receive a plurality of print jobs, each including a plurality of documents to be printed;
   receive job tickets including a description as to how pages in the plurality of documents are to be printed;
   store the plurality of documents in a document pool;
   store a document property record associated with each of the plurality of documents in the document pool; and
   process the job tickets and the document property records to generate a combined print job including two or more of the plurality of the documents, including:
      extracting document pages from the pool; and
      analyzing the property record associated with each of the extracted document pages to determine the documents that are to be combined, including:
         analyzing plex settings in a first document property record associated with a first document to track an association between the first document and a print job associated with the first document; and
         adjusting the plex settings in the first document to a plex setting of the print job.

2. The computer-readable medium of claim 1, wherein processing the two or more documents further comprises:
   analyzing plex settings in a second document property record associated with a second document to track an association between the second document and a print job associated with the second document.

3. The computer-readable medium of claim 2, wherein processing the two or more documents further comprises extracting one or more plex exceptions included in the first and second documents.

4. The computer-readable medium of claim 3, wherein processing the two or more documents further comprises adjusting the one or more plex exceptions.

5. The computer-readable medium of claim 4, wherein adjusting the one or more plex exceptions comprises appending document pages to the combined print job.

6. The computer-readable medium of claim 5, further comprising instructions that, when executed by the one or more processors, cause the one or more processors to generate a combined job ticket associated with the combined print job.

7. The computer-readable medium of claim 6, wherein adjusting the one or more plex exceptions further comprises appending the one or more plex exceptions to the combined job ticket.

8. The computer-readable medium of claim 7, further comprising instructions that, when executed by the one or more processors, cause the one or more processors to:
   save the combined job ticket; and
   save the combined print job.

9. The computer-readable medium of claim 1, wherein a document property record includes a source document file name, a starting document page number, number of document pages and source job ticket file name.

10. A system comprising:
    at least one physical memory device to store a print workflow manager; and
       one or more processors coupled with the at least one physical memory device to execute the print workflow manager to receive a plurality of print jobs, each including a plurality of documents to be printed, receive job tickets including a description as to how pages in the plurality of documents are to be printed, store the plurality of documents in a document pool, store a document property record associated with each of the plurality of documents in the document pool, and process the job tickets and the document property records to generate a combined print job including two or more of the plurality of the documents, including extracting document pages from the pool and analyzing the property record associated with each of the extracted document pages to determine the documents that are to be combined, including analyzing plex settings in a first document property record associated with a first document to track an association between the first document and a print job associated with the first document and adjusting the plex settings in the first document to a plex setting of the print job.

11. The system medium of claim 10, wherein processing the two or more documents comprises analyzing plex settings in a first document property record associated with a first document to track an association between the first document and a print job associated with the first document.

12. The system of claim 11, wherein processing the two or more documents further comprises extracting one or more plex exceptions included in the first and second documents.

13. The system of claim 12, wherein processing the two or more documents further comprises adjusting the one or more plex exceptions.

14. The system of claim 13, wherein adjusting the one or more plex exceptions comprises appending document pages to the combined print job.

15. The system of claim 14, wherein the print workflow manager generates a combined job ticket associated with the combined print job.

16. The system of claim 15, wherein adjusting the one or more plex exceptions further comprises appending the one or more plex exceptions to the combined job ticket.

17. The system of claim 16, wherein the print workflow manager saves the combined job ticket and saves the combined print job.

18. The system of claim 17, wherein the print workflow manager transmits the combined print job to be printed based on the combined job ticket.

19. A method for processing print documents, comprising:
    identifying a first group of documents to be printed;

identifying a second group of documents from the first group of documents to be printed, wherein each of the documents within the second group of documents has a first predetermined characteristic;

determining a predetermined print aspect for the second group of documents by evaluating a first job ticket for the first group of documents; and creating a second job ticket for the second group of documents such that when evaluating the second group of documents and the second job ticket separately from the first group of documents and the first job ticket, the second job ticket redefines the association of a predetermined print aspect from the first job ticket to at least one new page number of one of the print documents from the second group of documents, thereby maintaining the predetermined print aspect for the pages of the second group of documents as originally defined by the first job ticket.

20. The method of claim 19, further comprising sending the second group of documents and the second job ticket to the printer for printing.

21. The method of claim 20, wherein the predetermined first characteristic comprises one of a similar zip code, geographic destination, and an estimated cumulative weight of a subset of the documents to be printed.

22. The method of claim 19, wherein the predetermined print aspect comprises at least one of a plex, hole making, copies, n-up, output bin, page rotation, and page cells.

* * * * *